United States Patent
Tsuzaki

(10) Patent No.: US 9,645,593 B2
(45) Date of Patent: May 9, 2017

(54) VOLTAGE REGULATOR

(71) Applicant: Seiko Instruments Inc., Chiba-shi, Chiba (JP)

(72) Inventor: Toshiyuki Tsuzaki, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 0 days.

(21) Appl. No.: 14/968,002

(22) Filed: Dec. 14, 2015

(65) Prior Publication Data

US 2016/0099644 A1    Apr. 7, 2016

Related U.S. Application Data

(63) Continuation of application No. PCT/JP2014/064268, filed on May 29, 2014.

(30) Foreign Application Priority Data

Jun. 21, 2013    (JP) ................................. 2013-130493

(51) Int. Cl.
 G05F 1/573    (2006.01)
 G05F 1/575    (2006.01)
 H02M 1/32    (2007.01)

(52) U.S. Cl.
 CPC .............. *G05F 1/573* (2013.01); *G05F 1/575* (2013.01); *H02M 1/32* (2013.01)

(58) Field of Classification Search
 CPC .......... H02M 1/32; G05F 1/565; G05F 1/573; G05F 1/575
 See application file for complete search history.

(56) References Cited

U.S. PATENT DOCUMENTS 5,041,777 A * 8/1991 Riedger .................. G05F 1/573
  323/277
5,578,916 A * 11/1996 Muterspaugh .......... G05F 1/573
  323/267

(Continued)

FOREIGN PATENT DOCUMENTS

JP    2003-005847 A    1/2003
JP    2005-051854 A    2/2005

OTHER PUBLICATIONS

International Search Report, and English language translation thereof, in corresponding International Application No. PCT/JP2014/064268, dated Sep. 2, 2014, 3 pages.

*Primary Examiner* — Fred E Finch, III
(74) *Attorney, Agent, or Firm* — Brinks Gilson & Lione

(57) ABSTRACT

Provided is a voltage regulator in which an output current can be controlled stably and accurately to an overcurrent protection set value without the need of providing a phase compensation circuit including an element having a large area. The voltage regulator includes a constant voltage control circuit including: a first differential amplifier circuit for comparing a first reference voltage and a feedback voltage to each other; and an output transistor to be controlled by an output voltage of the first differential amplifier circuit, and an overcurrent protective circuit including: a resistor for measuring the output current; a second differential amplifier circuit for measuring a difference between voltages at both terminals of the resistor; a comparator for comparing an output voltage of the second differential amplifier circuit and a second reference voltage to each other; and a switch to be controlled by a detection signal of the comparator. When the output current equal to or larger than an overcurrent protection set value flows, the output voltage of the second differential amplifier circuit is input to the first differential amplifier circuit via the switch, to (Continued)

thereby switch control of the output transistor from control based on the constant voltage control circuit to control based on the overcurrent protective circuit.

3 Claims, 3 Drawing Sheets

(56) References Cited

U.S. PATENT DOCUMENTS

| | | | | |
|---|---|---|---|---|
| 5,844,440 | A * | 12/1998 | Lenk | G05F 1/573 327/110 |
| 6,608,520 | B1 | 8/2003 | Miyazaki | |
| 7,081,742 | B2 | 7/2006 | Ito et al. | |
| 7,622,902 | B1 * | 11/2009 | Kao | G05F 1/575 323/276 |
| 2002/0057079 | A1 * | 5/2002 | Horie | G05F 1/575 323/282 |
| 2006/0170401 | A1 * | 8/2006 | Chen | G05F 1/575 323/273 |
| 2007/0273346 | A1 * | 11/2007 | Lin | G05F 1/573 323/276 |
| 2009/0206807 | A1 * | 8/2009 | Imura | G05F 1/573 323/277 |
| 2012/0194947 | A1 * | 8/2012 | Nakashimo | G05F 1/573 361/18 |
| 2014/0266098 | A1 * | 9/2014 | Dao | G05F 1/573 323/273 |
| 2015/0145493 | A1 * | 5/2015 | Bhattad | G05F 1/56 323/273 |

* cited by examiner

VOLTAGE REGULATOR

RELATED APPLICATIONS

The present application is a continuation of International Application PCT/JP2014/064268, with an international filing date of May 29, 2014, which claims priority to Japanese Patent Application No. 2013-130493 filed on Jun. 21, 2013, the entire contents of which are incorporated herein by reference.

BACKGROUND OF THE INVENTION

1. Field of the Invention

The present invention relates to a voltage regulator for outputting a constant voltage, and more specifically, to an overcurrent protective circuit for protecting a circuit by reducing an output current when an overcurrent flows to an output terminal.

2. Description of the Related Art

A voltage regulator inputs a high power supply voltage from a power supply such as a lithium ion secondary cell and a battery, and outputs a voltage lower than the power supply voltage to a device such as a microcontroller. If an output terminal of the voltage regulator is short-circuited to a GND voltage (0 V) for some reason, the voltage regulator controls a resistance value of an output transistor to be decreased, and hence a large current flows to the output terminal. The voltage regulator needs an overcurrent protective circuit in order to protect the circuit because a large current flows to the output terminal.

FIG. 3 is a block diagram of a related-art voltage regulator. The related-art voltage regulator includes a constant voltage control circuit 320 and an overcurrent protective circuit 321.

An input voltage source 101 is connected between a power supply terminal 10 and a ground terminal 11. A load resistor 103 is connected between an output terminal 12 and the ground terminal 11. A resistor 111 and an output transistor 102 are connected in series between the power supply terminal 10 and the output terminal 12.

The constant voltage control circuit 320 is now described. A differential amplifier circuit 304 has an inverting input terminal to which a feedback voltage Vfb obtained by dividing an output voltage Vout with use of a voltage divider resistor circuit 306 is input, and has a non-inverting input terminal to which a reference voltage Vref of a reference voltage circuit 305 is input. The differential amplifier circuit 304 outputs a current I1 from its output terminal. An NPN transistor 308 and a resistor 307 form a common source amplifier circuit. The output transistor 102 has a gate to which an output voltage Vdry of the common source amplifier circuit is input, to thereby form a negative feedback for controlling the output voltage Vout so as to control the output voltage Vout to a set voltage.

The overcurrent protective circuit 321 is now described. A differential amplifier circuit 312 has a non-inverting input terminal to which a voltage Vin of the input voltage source 101 is input, and has an inverting input terminal to which a voltage VR generated in the resistor 111 is input. A differential amplifier circuit 313 has a non-inverting input terminal to which an output voltage of the differential amplifier circuit 312 is input, and has an inverting input terminal to which a reference voltage Vref2 of a reference voltage circuit 314 is input. The differential amplifier circuit 313 outputs a current I2. The current I2 is mirrored by an NPN transistor 315 and an NPN transistor 316 to be a current I3. The NPN transistor 316 has a collector connected to an output of the differential amplifier circuit 304.

In this case, when the output terminal 12 is short-circuited to the ground terminal 11, the feedback voltage Vfb approaches a ground voltage Vss, with the result that the output voltage Vdry of the common source amplifier circuit decreases. Then, the output transistor 102 is turned on to increase an output current Iout. As a result, the voltage VR decreases due to a voltage drop caused by the resistor 111, and then the output voltage of the differential amplifier circuit 312 increases. When the output voltage of the differential amplifier circuit 312 becomes higher than the reference voltage Vref2, the differential amplifier circuit 313 increases the current I2 flowing to the collector of the NPN transistor 315. As a result, the current I3 mirrored by the mirror circuit increases, and then a base current (I1-I3) of the NPN transistor 308 decreases. Because the base current of the NPN transistor 308 decreases, the output voltage Vdry of the common source amplifier circuit increases to decrease the output current Iout. In this manner, a negative feedback for controlling the output current is formed to control the output current Iout to an overcurrent protection set current.

In the related-art voltage regulator as described above, however, the negative feedback for controlling the output voltage and the negative feedback for controlling the output current operate during the operation of the overcurrent protective circuit. Accordingly, when the gain of the negative feedback for controlling the output current is larger than the gain of the negative feedback for controlling the output voltage, the output voltage Vout is liable to oscillate, and hence a phase compensation circuit having a large capacitance is needed, and the chip area increases. Further, when the gain of the negative feedback for controlling the output current is smaller than the gain of the negative feedback for controlling the output voltage, the influence of the negative feedback for controlling the output voltage is large, and hence there is a problem in that the overcurrent protection for the output current Iout hardly works.

SUMMARY OF THE INVENTION

In order to solve the related-art problem, a voltage regulator including an overcurrent protective circuit according to one embodiment of the present invention includes a constant voltage control circuit including: a first differential amplifier circuit for comparing a first reference voltage and a feedback voltage to each other; and an output transistor to be controlled by an output voltage of the first differential amplifier circuit, and an overcurrent protective circuit including: a resistor for measuring the output current; a second differential amplifier circuit for measuring a difference between voltages at both terminals of the resistor; a comparator for comparing an output voltage of the second differential amplifier circuit and a second reference voltage to each other; and a switch to be controlled by a detection signal of the comparator. When the output current equal to or larger than an overcurrent protection set value flows, the output voltage of the second differential amplifier circuit is input to the first differential amplifier circuit via the switch, to thereby switch control of the output transistor from control based on the constant voltage control circuit to control based on the overcurrent protective circuit.

According to the voltage regulator including the overcurrent protective circuit of one embodiment of the present invention, the output current can be controlled stably and accurately to an overcurrent protection set value without the need of providing a phase compensation circuit including an element having a large area.

DETAILED DESCRIPTION OF THE PREFERRED EMBODIMENT

Now, a voltage regulator according to an embodiment of the present invention is described with reference to the accompanying drawings.

Figure 1:
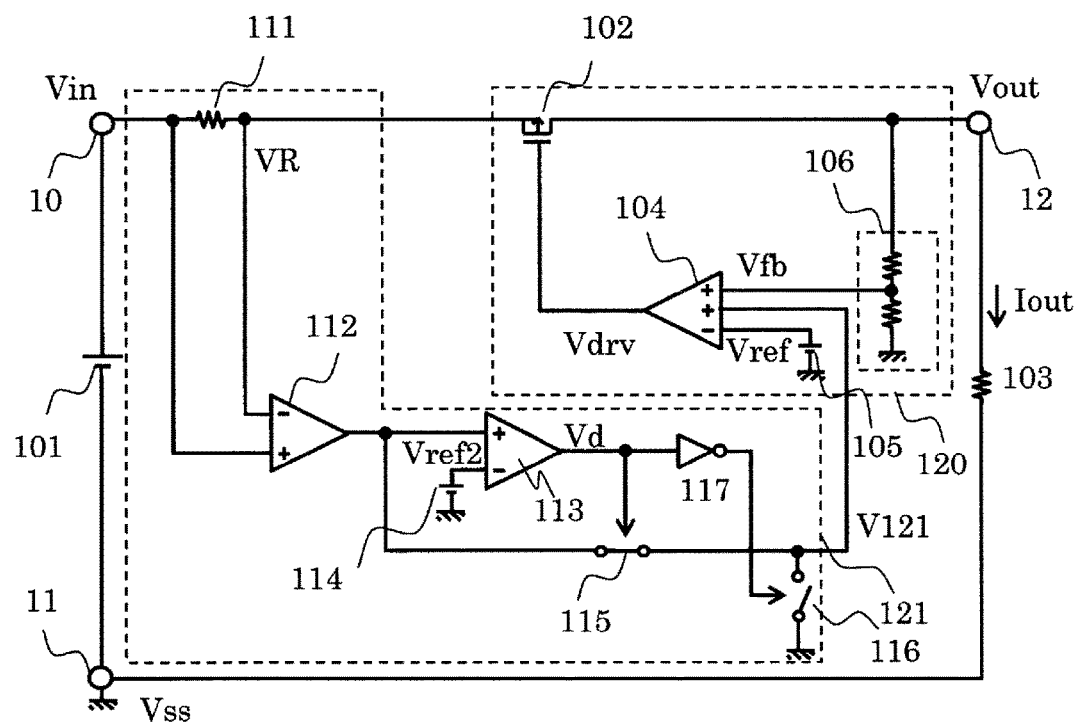
FIG. 1 is a block diagram illustrating a voltage regulator according to an embodiment of the present invention.

FIG. 1 is a block diagram illustrating the voltage regulator according to this embodiment.

The voltage regulator according to this embodiment includes a constant voltage control circuit 120 and an overcurrent protective circuit 121. An input voltage source 101 is connected between a power supply terminal 10 and a ground terminal 11. A load resistor 103 is connected between an output terminal 12 and the ground terminal 11. A resistor 111 and an output transistor 102 are connected in series between the power supply terminal 10 and the output terminal 12.

The constant voltage control circuit 120 includes a differential amplifier circuit 104, a reference voltage circuit 105, and a voltage divider resistor circuit 106. The voltage divider resistor circuit 106 is connected between the output terminal 12 and the ground terminal 11. The differential amplifier circuit 104 has a first non-inverting input terminal connected to an output terminal of the voltage divider resistor circuit 106, a second non-inverting input terminal connected to an output terminal of the overcurrent protective circuit 121, an inverting input terminal connected to the reference voltage circuit 105, and an output terminal connected to a gate of the output transistor 102.

The overcurrent protective circuit 121 includes a differential amplifier circuit 112, a comparator 113, a reference voltage circuit 114, switches 115 and 116, and an inverter 117. The differential amplifier circuit 112 has a non-inverting input terminal connected to a connection point between the power supply terminal 10 and one terminal of the resistor 111, and an inverting input terminal connected to the other terminal of the resistor 111. The comparator 113 has a non-inverting input terminal connected to an output terminal of the differential amplifier circuit 112 and an inverting input terminal connected to the reference voltage circuit 114. The switch 115 is connected between the output terminal of the differential amplifier circuit 112 and the output terminal of the overcurrent protective circuit 121. The switch 115 has a control terminal connected to an output terminal of the comparator 113. The switch 116 is connected between the output terminal of the differential amplifier circuit 112 and the ground terminal 11. The switch 116 has a control terminal connected to the output terminal of the comparator 113 via the inverter 117.

The voltage divider resistor circuit 106 outputs a feedback voltage Vfb obtained by dividing an output voltage Vout. The reference voltage circuit 105 outputs a reference voltage Vref. The differential amplifier circuit 104 amplifies a difference between the feedback voltage Vfb and the reference voltage Vref, and outputs an output voltage Vdry to the gate of the output transistor 102. In this manner, a negative feedback for controlling the output voltage is formed to control the output voltage Vout to a set voltage.

The differential amplifier circuit 112 amplifies a difference between voltages at both terminals of the resistor 111, and outputs a resultant voltage. The comparator 113 compares the output voltage of the differential amplifier circuit 112 and a reference voltage Vref2 to each other, and outputs a resultant signal Vd. The switch 115 is short-circuited when the output voltage of the differential amplifier circuit 112 is higher than the reference voltage Vref2, that is, when the signal Vd is High. The switch 116 is turned on when the output voltage of the differential amplifier circuit 112 is lower than the reference voltage Vref2, that is, when the signal Vd is Low. The output voltage of the differential amplifier circuit 112 is input via the switch 115 from the output terminal of the overcurrent protective circuit 121 to the second non-inverting input terminal of the differential amplifier circuit 104 as an output voltage V121. The differential amplifier circuit 104 amplifies a difference between the feedback voltage Vfb and the output voltage V121, and outputs the output voltage Vdry to the gate of the output transistor 102. In this manner, a negative feedback for controlling an output current is formed to control an output current Iout to an overcurrent protection set current.

Figure 2:
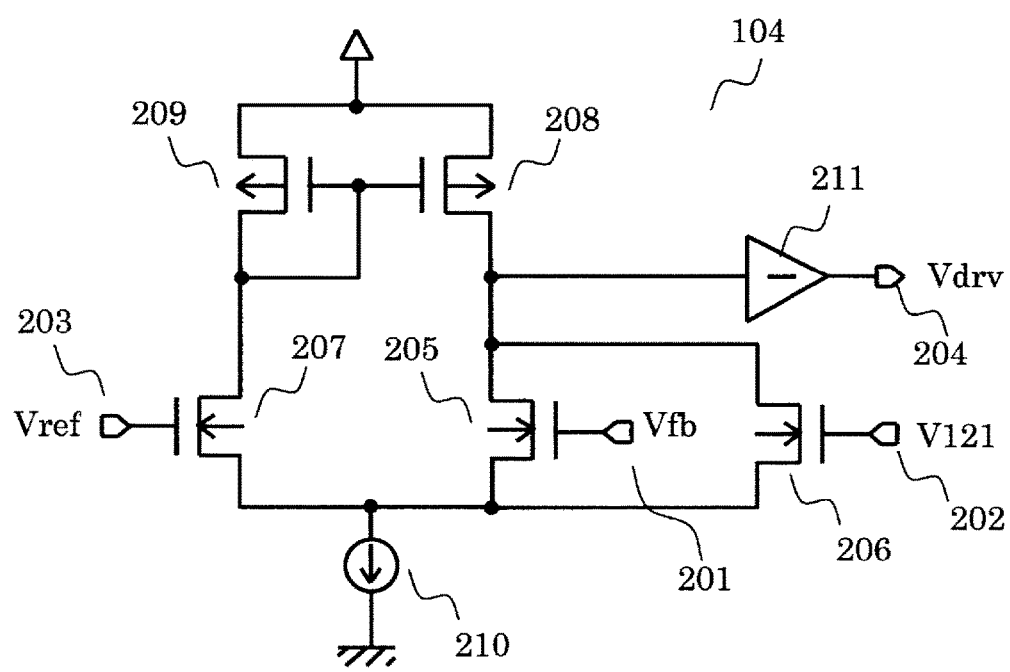
FIG. 2 is a circuit diagram illustrating an example of a differential amplifier circuit of the voltage regulator according to the embodiment of the present invention.
Figure 3:
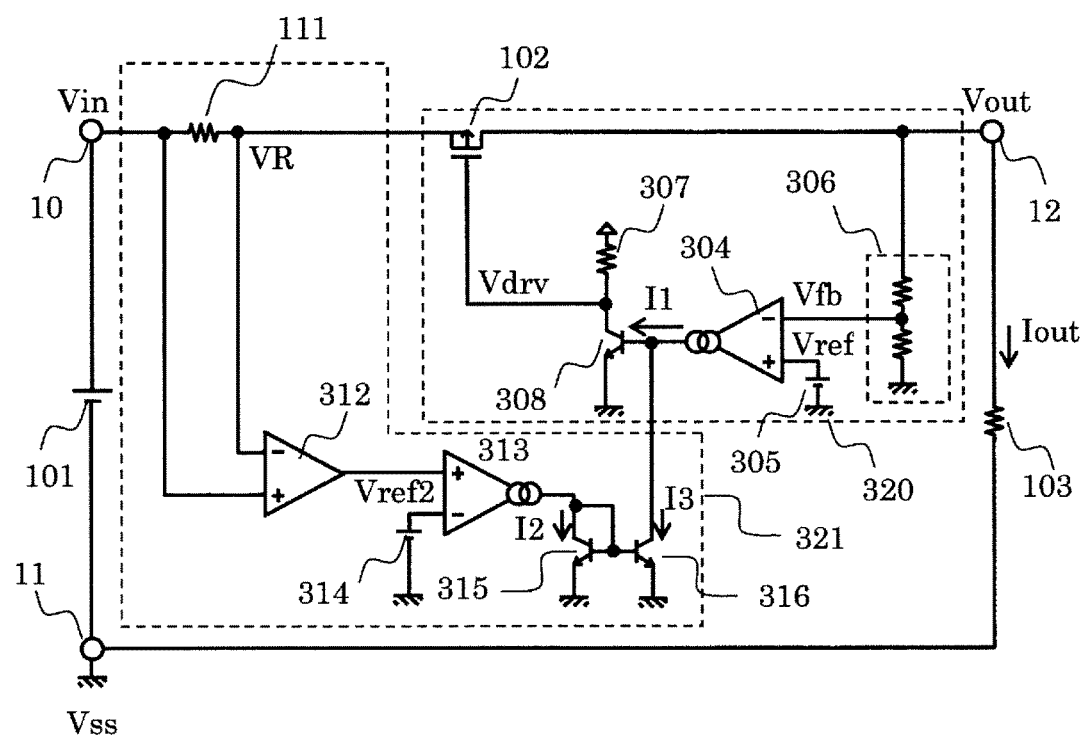
FIG. 3 is a block diagram of a related-art voltage regulator.

FIG. 2 is a circuit diagram illustrating an example of the differential amplifier circuit 104.

The differential amplifier circuit 104 includes a first non-inverting input terminal 201, a second non-inverting input terminal 202, an inverting input terminal 203, an output terminal 204, NMOS transistors 205, 206, and 207, PMOS transistors 208 and 209, a current source 210, and an inverting amplifier circuit 211.

The NMOS transistor 205 has a gate connected to the first non-inverting input terminal 201. The NMOS transistor 206 has a gate connected to the second non-inverting input terminal 202. The NMOS transistor 207 has a gate connected to the inverting input terminal 203. Sources of the NMOS transistors 205, 206, and 207 are connected in common to the current source 210. The PMOS transistor 208 has a drain connected to drains of the NMOS transistor 205 and the NMOS transistor 206 and an input terminal of the inverting amplifier circuit 211. The PMOS transistor 209 has a drain and a gate that are connected in common to a drain of the NMOS transistor 207 and a gate of the PMOS transistor 208. The inverting amplifier circuit 211 has an output terminal connected to the output terminal 204.

The feedback voltage Vfb is input to the first non-inverting input terminal 201, the voltage V121 is input to the second non-inverting input terminal 202, and the reference voltage Vref is input to the inverting input terminal 203. The output terminal 204 outputs the output voltage Vdrv.

The differential amplifier circuit 104 configured as described above operates as follows in response to an input voltage.

When both the feedback voltage Vfb and the voltage V121 are lower than the reference voltage Vref, a current supplied by the PMOS transistor 208 is larger than currents supplied by the NMOS transistor 205 and the NMOS transistor 206. As a result, a drain voltage of the PMOS transistor 208 increases to decrease the output voltage Vdrv.

When the feedback voltage Vfb is higher than the reference voltage Vref, the current supplied by the PMOS transistor 208 is smaller than the current supplied by the NMOS transistor 205. As a result, the drain voltage of the PMOS transistor 208 decreases to increase the output voltage Vdrv. At this time, the resistance of the NMOS transistor 205 is smaller than the resistance of the NMOS transistor 206, and hence the NMOS transistor 205 supplies a current dominantly.

When the voltage V121 is higher than the reference voltage Vref, the current supplied by the PMOS transistor 208 is smaller than the current supplied by the NMOS transistor 206. As a result, the drain voltage of the PMOS transistor 208 decreases to increase the output voltage Vdrv. At this time, the resistance of the NMOS transistor 206 is smaller than the resistance of the NMOS transistor 205, and hence the NMOS transistor 206 supplies a current dominantly.

Next, an overcurrent protective operation of the voltage regulator according to this embodiment is described.

In a normal operation, the output voltage of the differential amplifier circuit 112 is lower than the reference voltage Vref2, and hence the output Vd of the comparator 113 becomes Low. Then, the switch 115 is opened, and the switch 116 is short-circuited. As a result, a ground voltage Vss is input to the second non-inverting input terminal of the differential amplifier circuit 104, and then the differential amplifier circuit 104 outputs a voltage determined based on the voltage of the first non-inverting input terminal and the voltage of the inverting input terminal, that is, the feedback voltage Vfb and the reference voltage Vref.

When the output terminal 12 is short-circuited to the ground terminal 11, the feedback voltage Vfb approaches the ground voltage Vss, and then the output voltage Vdry of the differential amplifier circuit 104 decreases. Because the output transistor 102 is turned on, the output current Iout increases. When the output current Iout increases, a voltage VR decreases due to a voltage drop caused by the resistor 111, and the output voltage of the differential amplifier circuit 112 increases. When the output voltage of the differential amplifier circuit 112 becomes higher than the reference voltage Vref2, the output Vd of the comparator 113 becomes High. Then, the switch 115 is short-circuited, and the switch 116 is opened. As a result, the same voltage as the output voltage of the differential amplifier circuit 112 is input to the second non-inverting input terminal of the differential amplifier circuit 104. At this time, the output voltage of the differential amplifier circuit 112 has the same value as that of the reference voltage Vref2. When the output current Iout further increases, the output voltage of the differential amplifier circuit 112 becomes higher than the feedback voltage Vfb, and then the differential amplifier circuit 104 outputs a voltage determined based on the voltage of the second non-inverting input terminal and the voltage of the inverting input terminal, that is, the output voltage of the differential amplifier circuit 112 and the reference voltage Vref. Consequently, the differential amplifier circuit 104 controls the gate of the output transistor 102 to prevent an overcurrent based on the output voltage of the overcurrent protective circuit 121.

In this case, it is preferred that the comparator 113 be provided with hysteresis in order to prevent chattering. Further, it is preferred that the reference voltage Vref and the reference voltage Vref2 be equal to each other in order for the differential amplifier circuit 104 to be smoothly switched between the control based on the first non-inverting input terminal and the control based on the second non-inverting input terminal.

First, the case where the output current Iout is smaller than an overcurrent protection set value is described.

The output voltage of the differential amplifier circuit 112 increases in proportion to the output current Iout, but is lower than the reference voltage Vref2, and hence the output Vd of the comparator 113 becomes Low. As a result, the switch 115 is opened, and the switch 116 is short-circuited. Then, the output terminal of the overcurrent protective circuit 121 is connected to the ground terminal 11 (Vss), and the output voltage V121 becomes 0 V. As a result, in the differential amplifier circuit 104, the feedback voltage Vfb functions as a non-inverting input signal, and the output voltage Vout is controlled to a set voltage owing to the negative feedback of the constant voltage control circuit 120. At this time, the differential amplifier circuit 104 functions so that the voltage of the first non-inverting input terminal becomes equal to the voltage of the inverting input terminal, and then the feedback voltage Vfb becomes equal to the reference voltage Vref.

Next, the case where an output current equal to or larger than an overcurrent protection set value flows to the output current Iout is described.

When the output voltage of the differential amplifier circuit 112 increases to be higher than the reference voltage Vref2, the output Vd of the comparator 113 becomes High. As a result, the switch 115 is short-circuited, and the switch 116 is opened. Then, the output voltage V121 of the overcurrent protective circuit 121 becomes equal to the output voltage of the differential amplifier circuit 112. In this case, when the reference voltages Vref and Vref2 are set to be equal to each other, because the output voltage V121 is higher than the feedback Vfb, the output voltage V121 functions as an non-inverting input signal of the differential amplifier circuit 104, and the output current Iout is controlled to an overcurrent protection set current owing to the negative feedback of the overcurrent protective circuit 121.

As described above, according to the voltage regulator including the overcurrent protective circuit of this embodiment, when the output current equal to or larger than the overcurrent protection set value flows, the negative feedback for controlling the output voltage is disconnected but only the negative feedback for controlling the output current is enabled. Consequently, the output current can be controlled stably and accurately to the overcurrent protection set value.

What is claimed is:

1. A voltage regulator, comprising:
   a constant voltage control circuit comprising a negative feedback circuit for controlling an output voltage; and
   an overcurrent protective circuit comprising a negative feedback circuit for controlling an output current,
   the constant voltage control circuit comprising:
      a first differential amplifier circuit for comparing a first reference voltage and a feedback voltage to each other; and
      an output transistor to be controlled by an output voltage of the first differential amplifier circuit,
   the overcurrent protective circuit comprising:
      a resistor for measuring the output current;
      a second differential amplifier circuit for measuring a difference between voltages at both terminals of the resistor;
      a comparator for comparing an output voltage of the second differential amplifier circuit and a second reference voltage to each other; and
      a switch to be controlled by a detection signal of the comparator,
   wherein, when the output current equal to or larger than an overcurrent protection set value flows, the output voltage of the second differential amplifier circuit is input to the first differential amplifier circuit via the switch, to thereby switch control of the output transistor from control based on the constant voltage control circuit to control based on the overcurrent protective circuit.

2. A voltage regulator according to claim 1, wherein the first reference voltage and the second reference voltage are equal to each other.

3. A voltage regulator according to claim 1, wherein:
the first differential amplifier circuit includes a first non-inverting input terminal, a second non-inverting input terminal, and an inverting input terminal; and
the feedback voltage is input to the first non-inverting input terminal, the output voltage of the second differential amplifier circuit is input to the second non-inverting input terminal, and the first reference voltage is input to the inverting input terminal.

* * * * *